United States Patent [19]

Knabel et al.

[11] Patent Number: 4,944,531
[45] Date of Patent: Jul. 31, 1990

[54] DEVICE FOR COUPLING A BRACKET WHICH IS PROVIDED WITH A BUCKLE OF A SEAT BELT, TO A RETAINING MEMBER, WHICH IS FIXED IN A VEHICLE

[75] Inventors: Walter Knabel, Murnau-Staffelsee; Josef Mayer, Weichs; Stephan Wentker, Dachau, all of Fed. Rep. of Germany

[73] Assignee: Autoliv-Kolb, GmbH. & Co., Dachau, Fed. Rep. of Germany

[21] Appl. No.: 449,077

[22] Filed: Dec. 8, 1989

Related U.S. Application Data

[63] Continuation of Ser. No. 221,273, Jul. 19, 1988, abandoned.

[30] Foreign Application Priority Data

Jul. 21, 1987 [DE] Fed. Rep. of Germany ....... 3724134

[51] Int. Cl.[5] ...................... B60R 22/18; B60R 22/30
[52] U.S. Cl. ...................................... 280/806; 297/480
[58] Field of Search ................. 280/806, 801; 297/480

[56] References Cited

U.S. PATENT DOCUMENTS 4,239,260 12/1980 Hollowell ........................... 280/806
4,473,242 9/1984 Weman ................................ 280/806
4,705,296 11/1987 Andersson et al. ................. 280/806

FOREIGN PATENT DOCUMENTS 0015179 9/1980 European Pat. Off. .
0265747 5/1988 European Pat. Off. .
2104062 4/1972 France .
2429125 1/1980 France .

Primary Examiner—Kenneth R. Rice
Attorney, Agent, or Firm—Morgan & Finnegan

[57] ABSTRACT

In a device for coupling and locking a bracket, which is provided with a buckle of a seat belt, in case of danger to a retaining member, which is fixed in a vehicle, the bracket, or a housing part or the like which is connected to the bracket, is connected to a movable coupling member, which in a guide of a seat frame plate or the like is guided in such a manner or by a linkage is so connected to said seat frame plate or the like that a tension exerted on the buckle will cause the latter to be coupled to the retaining member, which is fixedly mounted in the vehicle.

10 Claims, 3 Drawing Sheets

DEVICE FOR COUPLING A BRACKET WHICH IS PROVIDED WITH A BUCKLE OF A SEAT BELT, TO A RETAINING MEMBER, WHICH IS FIXED IN A VEHICLE

This is a continuation of co-pending application Ser. No. 221,273, filed on July 19, 1988 now abandoned.

BACKGROUND OF THE INVENTION

1. Field of the Invention

This invention relates to a device for coupling and locking a bracket, which is provided with a buckle of a seat belt, in case of danger to a retaining member, which is fixed in a vehicle.

2. Description of the Prior Art

For increased riding convenience it may be desirable to connect the bracket which is provided with the buckle of a seat belt to the seat frame plate or to a side plate of the seat so that the person who is to be held on the seat will find the buckle always at the same location when he or she desires to insert the latch striker into the buckle, regardless of the elevation and longitudinal position to which the seat has been adjusted.

If the safety belt is provided with the belt tightener which has been described in the patent application which is entitled "Belt Tightener for Seat Belts in Vehicles" and is filed on even date herewith, so that the safety is the occupant is improved, the bracket which carries the buckle is guided for a longitudinal displacement in a housing, which is connected to the sheet metal frame of the seat or to another part of the vehicle and said housing is provided with means which permit a pull-in movement of the bracket and block its movement in the opposite direction. But, as a rule, seat frame plates, seat side plates, housing for locking the bracket that is provided with the buckle, and other parts for mounting the bracket cannot be sufficiently stiff and strong unless considerable costs are incurred, which add to the costs of the vehicle. These parts should be so stiff and strong that in case of a crash or other accident they will reliably take up and transmit the tensile forces then acting on the seat belt. For this reason it is a desire to provide an device which is of the kind described first hereinbefore and which relieves the intermediate structures and housings for holding the bracket for the buckle and which in case of danger directly couples the bracket to a retaining member, which is fixed in the vehicle.

In a device of the kind described first hereinbefore and known from Published German Application No. 28 00 261, a tensile lug which carries the buckle is connected by a shearable rivet to a wall of a guide housing, which is approximately rectangular in cross-section. The guide housing is secured by spacers to a fixture element or to the frame of the seat. A toothed lug, which at its lower end is adapted to be anchored to the seat rail, is so guided on the inside surface of the guide housing that is opposite to the tensile lug that the toothed lug will be displaced relative to the guide housing during an adjustment of the seat in height. The tensile lug which carries the buckle is formed on its lower portion with two locking teeth, which fit in between the teeth of the toothed lug. If the accelerating forces which are due to a crash or other accident cause the wearer of the seat belt to pull out the tensile lug by means of the buckle, the rivet which connects the tensile lug to the guide housing will be sheared off so that inclined slide faces will guide the lower portion of the tensile lug toward the toothed lug, the locking teeth of the tensile lug will interengage with the teeth of the toothed lug, and the tensile lug will thus be anchored to the toothed lug that is connected to the seat rail.

Even a sharp braking and/or smaller accidents usually give rise to substantial accelerating forces on the wearer of the seat belt and whereas said forces are weaker than those which are exerted in case of a crash they will result in a considerable load on and stressing of the seat and for this reason should also directly be transmitted to the body of the vehicle.

SUMMARY OF THE INVENTION

For this reason it is an object of the invention to provide a device which is of the kind described first hereinbefore and which has a simple and functionally reliable structure and can take up and transmit to retaining members, which are fixedly mounted in the vehicle, even accelerating forces which are weaker than accelerating forces which would be exerted in case of a crash.

That object is accomplished in accordance with the invention in that the bracket, or a housing part or the like which is connected to the bracket, is connected to a movable coupling member, which in a guide of a seat frame plate or the like is guided in such a manner or by a linkage is so connected to said seat frame plate or the like that a tension exerted on the buckle will cause the latter to be coupled to the retaining member, which is fixedly mounted in the vehicle. When a tensile force exerted on the buckle via the seat belt exceeds the tensile force which during normal movements of the wearer of the belt will permit the belt to be pulled from the belt reel whereas the belt-sensitive system will not block the belt reel, such a tensile force will indicate that the safety of the wearer of the belt cannot be ensured unless the belt is blocked in that the bracket is coupled to the retaining member that is fixed in the vehicle. That coupling should be effected by a movement which is as short as possible, without a pulling-out of the buckle over a superfluously long distance.

In a desirable embodiment of the invention a toothed locking lever which constitutes the first coupling member is pivoted to the lower end portion of the bracket and at a distance from its pivotal axis is provided with a bore or pin, which is connected like a crankpin to a pin or bore of the seat plate or the like in such a manner that a tension that is exerted on the bracket will pivotally move the locking lever toward a tie rod that is pivoted to the vehicle and has mating teeth, whereby the teeth are moved into coupling engagement with each other. The eccentricity between the pin and the pivot, which acts like a crankpin, may be so small that even a short pull-out movement of the bracket will result in such a large pivotal movement of the locking lever that the latter will engage and be coupled to the tie rod.

The locking lever suitably carries at its free end a toothed element having teeth which are directed toward the pivotal axis. The locking lever may be U-shaped and in that case is pivoted adjacent to the free ends of its legs, which are interconnected by a portion which is provided with the internal teeth.

The tie rod is suitably held by a spring in engagement with an extension of the pivot of the bracket or with a member that is connected thereto.

In another embodiment of the invention the bracket is adapted to be locked in case of danger in a housing, which is preferably secured to the seat of the vehicle, and a locking member is provided, which is connected to the housing and in response to a tension exerted on the housing by the bracket for the buckle is positively coupled to a tie rod that is fixedly connected to the housing. The housing may also accommodate a belt tightener.

In a desirable embodiment the housing is pivoted to the seat and the locking member consists of a lever, which is pivoted in the housing and provided with sawtooth-like teeth and at a distance from its pivotal mounting is held by a crankpinlike pin or the like in such a manner in engagement with a member that is fixedly mounted in the vehicle that a pivotal movement performed by the housing in response to a tension exerted thereon will pivotally move the lever into engagement with the tie member, which is provided with mating teeth, so that the teeth will interengage and the housing will be coupled to the tie rod. In that design the seat can be adjusted in the usual manner and such adjustment will not displace the buckle relative to the seat so that the person to be protected will find the buckle always at the same location regardless of the adjusted position of the seat. In order to ensure in a simple manner that the tie rod will be held in engagement with the locking lever, the tie rod may consist of a lever that is pivoted to the vehicle and guided in the guide housing.

In another particularly desirable embodiment the retaining member that is fixed in the vehicle consists of a pivoted profiled guide member, a profiled member, which is pivoted to a sheet metal seat frame or seat side frame is longitudinally slidably guided on or in said profiled guide member in a telescopic arrangement, a pivot pin provided with a bracket for the buckle is guided in a slot or the like of the profiled member, a locking lever provided with at least one hooklike extension is pivoted on said pivot pin, and means are provided which in response to a pull-out movement of the pivot pin relative to the guided profiled member impart to the locking lever a pivotal movement toward a row of holes formed in the profiled guide member so that the hooklike extension of the lever is received by a hole of the row of holes for a locking action. That design of the device in accordance with the invention will ensure a compact and substantially enclosed structure.

The guided profiled member has suitably secured to it an end portion of a leaf spring, which has a free other portion that is at an angle to said end portion and cooperates in such a manner with a beveled wedgelike portion or with an abutment portion of the locking lever that a pivotal movement will be imparted to the latter during the pull-out movement thereof.

DETAILED DESCRIPTION OF THE PREFERRED EMBODIMENTS

Figure 1:
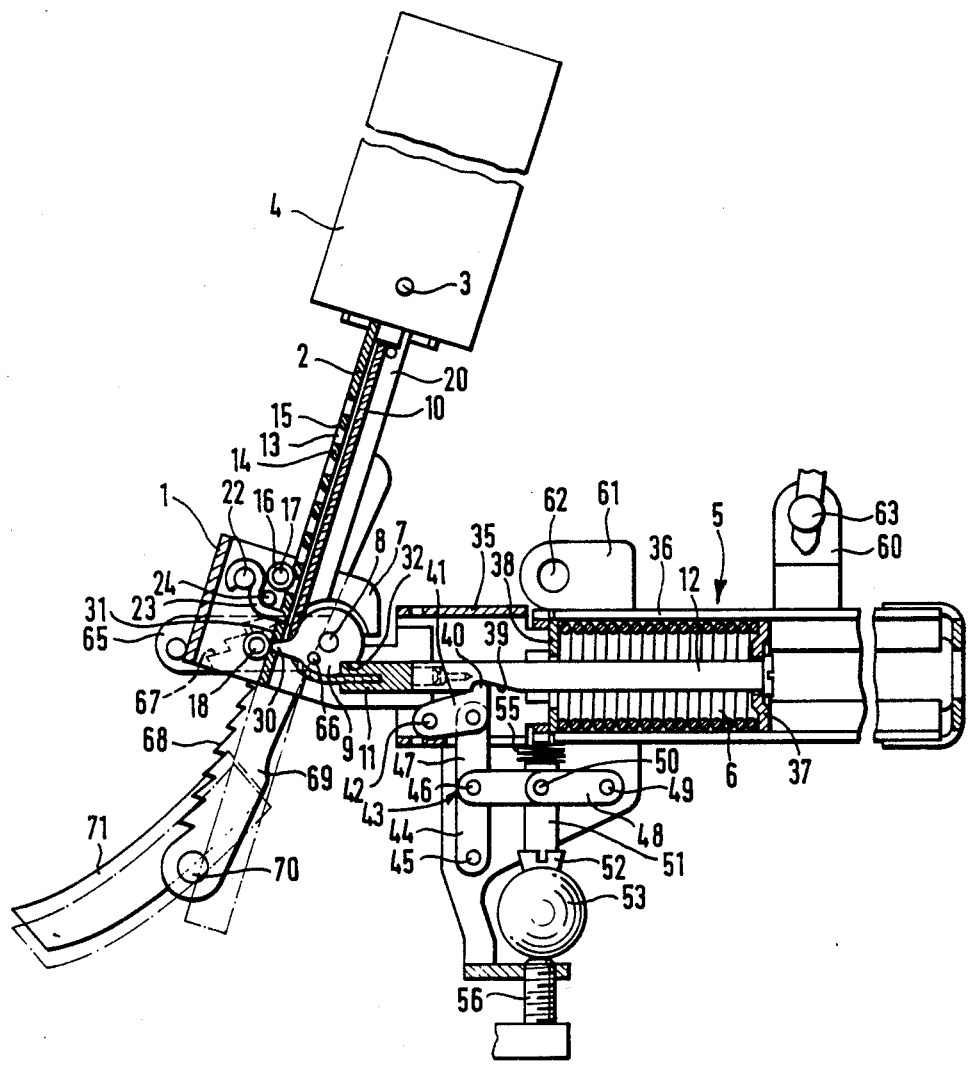
FIG. 1 is a longitudinal sectional view showing a belt tightener provided with means for locking the guide housing in case of need.

Illustrative embodiments of the invention will now be explained more in detail with reference to the drawing.

A guide housing 1 serves to guide the channel-shaped guide rail 2, which is hinged by the hinge 3 to the belt buckle 4. The guide housing 1 is rigidly connected to the spring housing 5, in which the prestressed coil spring 6 is held.

The guide housing 1 consists of a sheet metal element, which has been bent to a U-shape and the legs 7 of which constitute the side walls of the guide housing and are connected to the spring housing 5. A pulley 9 is rotatably mounted on an axle 8, which connects the side walls 7. The tension rope 10 is trained in an annular groove around the pulley 9. The upper end of the tension rope 10 is connected to the top end of the rail 2 or to the buckle 4. The other end of the tension rope 10 is connected to the tie rod 12 by a fastener 11.

The web portion of the rail 2 is formed with rectangular apertures 13, which constitute a row of holes and are separated from each other by runglike lands 14, which have rounded end lugs 15 on that side which is remote from the buckle 4. On both sides of the row of holes, the web of the rail bears in the guide housing 1 on slide bushings 16, which are slidably fitted on pins 17, 18, which are held in the side walls 7. The legs 20 of the rail 2 extend on opposite sides of the pulley 8 and their end edges are guided on the axle 8 of the pulley. Separate pins for guiding the side edges of the legs 20 may be provided in the side walls 7. A locking lever 23 is pivoted to a pin 22, which is held between the side walls 7. By a coil spring having end legs, or the like, not shown, the locking lever 23 is held in engagement with the pin 24, which is also held between the side walls 7. When the locking lever 23 bears against the pin 24, the wedge-shaped end portion of the lever 23 will extend into a hole 13 of the row of holes of the rail 2. During a displacement of the buckle 4 toward the guide housing 1, the locking lever 23 will jump over the runglike lands 14 as over ratchet teeth and in response to a pull-back movement will fall into an aperture so as to block the latter.

On the side of the annular groove for the tension rope 10, the pulley 9 is provided with projecting noses 30, which extend into a recess 31 of the rail to hold the latter in its normal position. In order to maintain that normal position the pulley 9 is formed with a steplike indentation 32, which receives the connector 11 of the tie rod 12 when the same is locked. By that locking of the pulley, the carrying rail 2 is fixed in position so that it cannot be depressed even when the latch striker of the belt is forced into the buckle 4 with a substantial force. The side walls 7 of the guide housing 1 have extensions, by which said housing 1 is connected to an intermediate housing 35, which is connected to a cylindrical housing 36, which contains the coil spring 6. The tie rod 12 extends through the coil spring 6 and at its other end carries a spring abutment 37, and a coverlike front wall 38 of the housing in such a manner that the convolutions of said spring substantially bear on each other. The housing wall 38 has a central bore, through which the tie rod 12 extends.

When the convolutions of the compression spring 6 bear on each other under pressure a detent indentation 39 formed in the tie rod 12 will be adjacent to the intermediate housing rod 35 and will receive for a locking action the detent nose 40 of a locking lever 41, which is pivoted on the pin 42 in the intermediate housing 35. One arm 42 of the toggle joint 43 is pivoted to the locking lever 41 near its other end. The other arm 44 of the toggle joint 43 is pivoted on the pivot 45, which is fixed to the housing. The two arms 42, 44 are hinged by a hinge pin 46, on which the arm 47 of the second toggle joint 48 is pivoted. The other arm 48 of the second toggle joint 48 is pivoted. The other arm 48 of the toggle joint 48 is pivoted on a pivot 49, which is fixed to the housing. The hinge pin 50 of the second toggle joint 49 carries on its underside a socket 52, which is connected to the retaining member 51. The sensor ball 53 of the vehicle-sensitive system is gripped between the socket 53 and an abutment that is fixed to the housing. The hinge pin 50 is biased by a biasing spring 55, which has a top end that bears on the housings 35, 36. The abutment for the ball 53 is constituted by the end face of the adjusting screw 56, by which the ball 53 is held between the socket 52 and the abutment. The retaining force is so selected that the ball will be pulled out of its mounting under the action of accelerating forces amounting to about 5 g (5 times the acceleration due to gravity). As the ball 53 is thrown out of its seat, the compression spring 55 will cause the toggle joints 48 and 43 to collapse so that the detent nose 40 is pulled out of the detent indentation 39 of the tie rod 12 and the latter is moved to the right and carries the buckle 4 along. When the belt has been tightened in the end position, the carrying rail 2 is locked by the locking member 23.

The housing 5 is connected by the mounting lugs 60, 61 to a side plate or the like of the seat. The mounting lug 61 has a bearing bore 62 and by said bearing bore is pivoted on a pivot pin of the side plate. The mounting lug 60 is provided with a pin 63, which is guided in a slot of the side plate in such a manner that the housing 5 is pivoted on the pivot pin of the mounting lug 61.

A locking lever 65 is pivoted on the axle 8 of the pulley 9 and at a distance from the axle 8 is provided with a crankpinlike pin 66, which extends into an associated bore of the side plate or the like. When tension acting on the buckle 4 imparts to the housing 5 a pivotal movement in the clockwise sense, the crank which connects the side plate to the locking lever 65 will impart to the latter a pivotal movement in the counterclockwise sense. In its forward portion the locking lever 65 is provided with sawtoothlike teeth 67. The pivotal movement of the locking lever 65 causes said teeth to interengage with the teeth 68 of a tie rod 69, which is hinged to the vehicle by a hinge 70. To maintain the interengaging position the tie rod 69 is guided on its rear side on the axle 8 of the pulley 9. The range of adjustment of the seat is indicated by the range 71 for adjustment in height. In case of danger, the teeth of the locking lever 65 can interengage with the teeth 68 of the tie rod 69 regardless of the position of the seat so that the guide housing 1 and with it the carrying rail 2 are directly connected to the tie rod 69.

Figure 2:
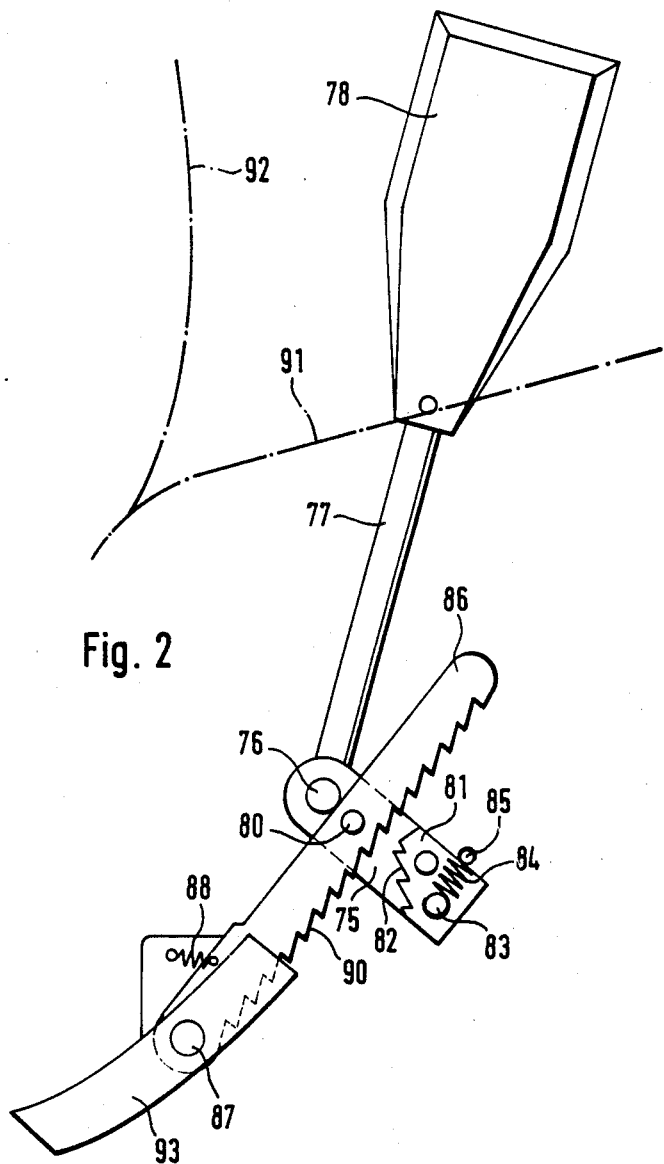
FIG. 2 is a diagrammatic side elevation showing the bracket for the buckle.

In the embodiment shown in FIG. 2 the locking lever 75 is directly pivoted on the pivot pin 76, which is held in corresponding bores at the lower end of the bracket 77, which at its top end carries the buckle 78 in the usual manner. The bracket 77 may consist of a rod or a profiled bar and is additionally held in holders, not shown, so that its pivotal movement about the pivot pin 76 is limited and the bracket remains substantially in a predetermined position.

At a distance from the pivot pin 76 the locking lever is provided with a bearing bore 80, which receives a pivot pin, which is secured to the seat frame plate or to a side plate of the seat. The free end of the locking lever 75 is riveted to a sheet metal element 81, which on that side which faces the pivot pin 76 is formed with sawtoothlike teeth 82. Adjacent to the free end of the locking lever 75, the latter is provided with a pin 83, on which one end of the tension spring 84 is hooked. The other end of that spring is secured to the retaining pin 85, which is provided on the side plate of the seat or the like. In an inactive position, the tension spring 84 holds the locking lever 75 in the illustrative position in engagement with the pin 85, which constitutes an abutment for the lever.

The tie rod 86 is pivoted on the pivot pin 87, which is secured to the floor of the vehicle or to a member which is connected to said floor and can take up strong tensile forces. A tensile spring 88 is secured at one end to the tie rod 86 and at its other end to a part which is fixedly mounted in the vehicle. The tie rod is held by said spring in engagement with the pivot pin 76, which extends beyond the locking lever 75 or the bracket 77 to provide a suitable abutment surface. The tie rod may consist of a sheet metal stamping and is provided with teeth 90 on that side which faces away from the pivot pin 76.

When tension is exerted via the belt on the buckle in case of danger, the pivot pin 76 acts virtually as a crankpin so that the locking lever 75 is pivotally moved about the pin 80 and the teeth 82, 90 of the locking lever and the tie bolt, respectively, interengage.

The contour lines of the seat 91 and of the backrest 92 have been indicated to show that regardless of the adjusted position of the seat the buckle 78 will always be in the same position relative to the seat. The range 93 in which the elevation can be adjusted is also only diagrammatically indicated.

Figure 4:
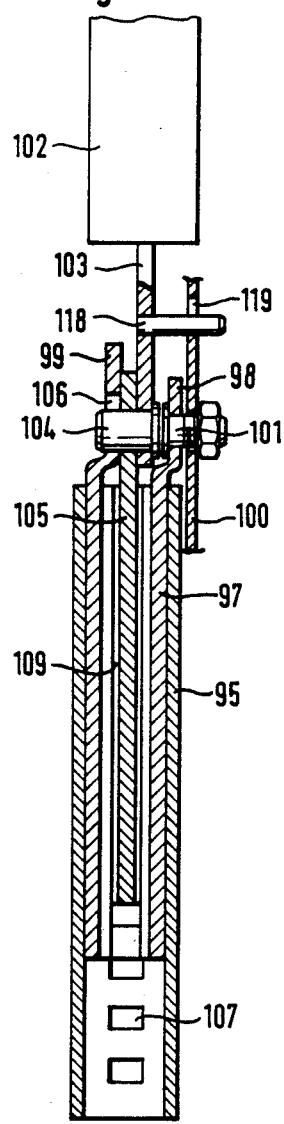
FIG. 4 is a sectional view showing the locking device and taken on line IV—IV in FIG. 3.
Figure 3:
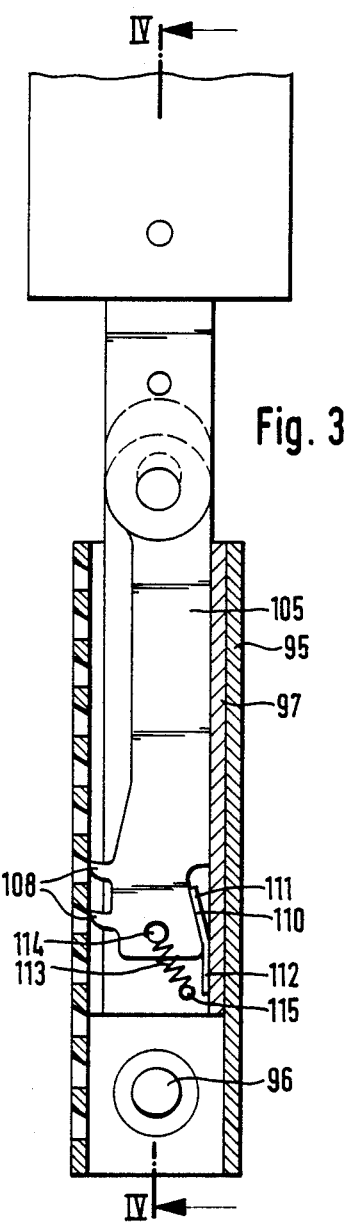
FIG. 3 is a longitudinal sectional view showing a third embodiment of a device for locking the bracket for the buckle.

In the embodiment shown in FIGS. 3 and 4 the retaining member that is fixed in the vehicle or the tie rod consists of a profiled hollow member 95, which is pivoted by the pivot pin 96 to a part which is fixed in the vehicle, e.g., to the guide rail for the seat. The profiled hollow member may be substantiallly C-shaped in cross-section and may consist of a bent piece of sheet metal. A profiled member 97 which is C-shaped in cross-section is telescoped in the profiled hollow member 95 for longitudinal displacement. At its top end, the profiled member 97 is provided with two parallel extension lugs 98, 99. That extension lug 98 which faces the seat frame plate 100 is formed with a bore, which is aligned with a bore of the seat frame plate 100. A screwthreaded pin 101 extends through the aligned bores and is secured to the seat frame plate 100. The profiled member 97 is pivoted on that pin in the bore of the extension lug 98.

The buckle 102 is pivoted to the top end of the sheet metal bracket 103. The bracket 103 has at its lower end a pivot pin 104, on which the locking lever 105 is pivoted, which extends into the C-shaped profiled member 97 and extends in the latter over a major part of its length. The pivot pin 104 extends into a slot 106 of the outer extension lug 99 of the profiled member 97.

The outer profiled hollow member 95 is provided in a side wall with a row of holes 107, which serve to lock the detent lever 105 to the profiled hollow member by interengaging with teeth 108, which are arranged in pairs, when the detent lever 105 is pivoted outwardly toward the row of holes. Because the C-shaped inner profiled member 107 has between its legs a longitudinal slot 109 adjacent to the row of holes 107, the locking lever 105 can pivotally move without an obstruction in case of need to move the teeth 108 into the holes 107.

A pivotal movement should be imparted to the locking lever in response to a pull-out movement of the buckle 102. For that purpose the locking lever 105 is provided at its lower end with a beveled wedgelike lug 110, which bears on an angled leg 111 of a leaf spring, the other leg 112 of which is riveted in the illustratd manner to that wall of the profiled member 97 which is opposite to the slot 109.

By a correspondingly obliquely arranged tension spring 113, which is secured to pins 114, 115 of the locking lever 105 and of the profiled member 97, the locking lever 105 is biased to its inactive lower position. When a tension is exerted on the buckle 102 so that the pivot pin 104 is moved to the top end of the slot 106 in the lug 99 of the profiled member 97, the wedgelike lug 110 slides on the leg 111 of the leaf spring that the locking lever 105 is pivoted in the clockwise sense in FIG. 3 and the teeth 108 enter the nearest holes 107. The force of the leaf spring 111, 112 is so selected that that spring will overcome the force of the weaker tension spring 113 during a pull-out movement of the locking lever 105.

In order to prevent a tilting of the bracket 103 about the pivot pin 104, the bracket is provided with a pin 118, which is guided in a slot 119 of the seat frame plate 100.

We claim:

1. A seat belt locking assembly for directly coupling a seat belt buckle to a vehicle in the event of a sudden acceleration or deceleration caused, for example, by a sudden impact, said device comprising:

a pivotable locking member which is directly coupled to the belt buckle and having teeth means; and a tie rod which is coupled directly to the vehicle but in close proximity to said locking member and generally restrained from moving away from said teeth means of said locking member, said tie rod having receiving means for lockably engaging said teeth means of said locking, said locking member and said tie rod being positioned relative to each other such that when a tensile force of at least a predetermined amount is exerted on the belt buckle, the locking member is caused to rotate towards said tie rod and said teeth means become lockably engaged with said receiving means to create a direct mechanical coupling between the belt buckle and the vehicle.

2. A locking assembly according to claim 1, wherein said locking member is pivotally mounted by an axle to a guide housing which forms part of a belt tightener assembly, said guide housing being directly coupled to the belt buckle, and said axle also providing rotatable mounting for a pulley to which is secured a crank pin spaced from said axle to cause a rotation of said locking member towards said tie rod when a tensile force is exerted on the belt buckle.

3. A locking assembly according to claim 2, wherein said tie rod is restrained from movement away from said teeth means of said locking member by said axle.

4. A locking element according to claim 3, wherein said teeth means and said engaging means comprise interengaging locking teeth.

5. A locking assembly according to claim 1, wherein said locking member is pivotally coupled to the seat belt by a pivot pin carried by a bracket member which is secured to the belt buckle, said pivot pin also restraining said tie rod from movement away from said teeth means of said locking member.

6. A locking assembly according to claim 5, wherein said locking member and said tie rod are separately brased such that under normal operation of the vehicle, the teeth means and engaging means are maintained in spaced apart relation.

7. A locking assembly according to claim 6, wherein said teeth means are provided by ratchet-toothed edged piece of metal fastened to said locking member.

8. A locking member according to claim 1, wherein said tie rod comprises a channel-like member secured to the vehicle and wherein said locking member is pivotally coupled to the belt buckle and resides within said channel-like tie rod.

9. A locking assembly according to claim 8, wherein said teeth means of said locking member comprise at least one tooth projecting from an edge of said locking member, and wherein said receiving means of said tie rod comprise a plurality holes in one wall of said channel-like tie rod, said holes positioned and proportioned to receive said tooth when a tensile force acts on the belt buckle.

10. A locking assembly to claim 9, which further includes first biasing means attached to said locking member for maintaining said tooth out of engagement with a said opening under normal conditions and second biasing means for urging said tooth into a said opening when a tensile force of predetermined magnitude acts on the belt buckle.

* * * * *